( 12 ) United States Patent
Li

(10) Patent No.: US 10,453,405 B2
(45) Date of Patent: Oct. 22, 2019

(54) GOA CIRCUIT AND LIQUID CRYSTAL DISPLAY PANEL

(71) Applicant: SHENZHEN CHINA STAR OPTOELECTRONICS SEMICONDUCTOR DISPLAY TECHNOLOGY CO., LTD., Shenzhen, Guangdong (CN)

(72) Inventor: Wenying Li, Guangdong (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/745,542

(22) PCT Filed: Jan. 5, 2018

(86) PCT No.: PCT/CN2018/071499
§ 371 (c)(1),
(2) Date: Jan. 17, 2018

(87) PCT Pub. No.: WO2019/119539
PCT Pub. Date: Jun. 27, 2019

(65) Prior Publication Data
US 2019/0189067 A1    Jun. 20, 2019

(30) Foreign Application Priority Data
Dec. 19, 2017    (CN) .............................. 201711372717

(51) Int. Cl.
*G09G 3/36* (2006.01)
*G02F 1/133* (2006.01)

(52) U.S. Cl.
CPC ....... *G09G 3/3611* (2013.01); *G02F 1/13306* (2013.01); *G09G 2300/0408* (2013.01); *G09G 2310/0286* (2013.01); *G09G 2310/08* (2013.01)

(58) Field of Classification Search
CPC ............... G09G 3/3611; G09G 3/3677; G09G 2310/0286
See application file for complete search history.

(56) References Cited

U.S. PATENT DOCUMENTS

2008/0266477 A1* 10/2008 Lee ...................... G09G 3/3677
                                                                    349/46
2016/0125954 A1    5/2016 Gu
2017/0372664 A1    12/2017 He et al.

FOREIGN PATENT DOCUMENTS

CN           105405385 A    3/2016

* cited by examiner

*Primary Examiner* — Michael Pervan
(74) *Attorney, Agent, or Firm* — Muncy, Geissler, Olds & Lowe, P.C.

(57) ABSTRACT

In a GOA circuit and a liquid crystal display panel provided by the present disclosure, by dividing GOA units in a GOA circuit into groups and cascading the GOA units in each group, and by successively outputting an enable signal to the first to $k^{th}$ GOA units at preset time intervals by an enable signal output unit so that the GOA circuit successively outputs a scanning signal from a first group to a $k^{th}$ group of GOA units, the number of cascades of GOA units is reduced, the signal attenuation is decreased, and the display effect of a liquid crystal display panel is thus improved.

20 Claims, 3 Drawing Sheets

GOA CIRCUIT AND LIQUID CRYSTAL DISPLAY PANEL

FIELD OF INVENTION

The present disclosure relates to the technical field of liquid crystal display, and more particularly to a GOA circuit and a liquid crystal display panel having the same.

BACKGROUND OF INVENTION

In recent years, the development of displays tends to high level of integration and low cost. One of important techniques is the achievement of mass production of the GOA (Gate Driver on Array) technique. By the GOA technique, a gate switching circuit is integrated on an array substrate of a display panel, so that the gate driver IC portion can be omitted. In this way, the costs of products are reduced from material cost and manufacturing process. Such a gate switching circuit integrated on the array substrate by the GOA technique is also called a GOA circuit or a shift register circuit.

The GOA circuit comprises a plurality of GOA units each comprising a plurality of TFTs (Thin Film Transistor), wherein each GOA unit is in correspondence to a row of scanning lines, and specifically, an output terminal of each GOA unit is connected to a row of scanning lines. In the prior art, the GOA circuit usually enables the scanning lines sequentially, i.e., sequentially from the first row to the last row. This will result in poor display of the panel.

Thus, it is necessary to provide a GOA circuit and a liquid crystal display panel having the same to overcome the problems existing in the conventional technology.

SUMMARY OF INVENTION

An objective of the present disclosure is to provide a GOA circuit and a liquid crystal display panel having the same, by which functions of the GOA circuit are expanded, scanning lines are enabled sequentially in a relatively flexible manner, and the display effect of a liquid crystal display panel is thus improved.

For this purpose, the present disclosure provides a GOA circuit having a plurality of GOA units, wherein the plurality of GOA units are divided into k groups of GOA units, and in any group of GOA units, two adjacent GOA units are spaced by k−1 GOA units; and each of the GOA units has a signal input terminal and a signal output terminal, and a signal output terminal of each of the GOA units is connected to a row of scanning lines; wherein the GOA circuit further comprises an enable signal output unit having first to $k^{th}$ output terminals which are in one-to-one correspondence to signal input terminals of the first to $k^{th}$ GOA units, and a signal output terminal of a $x^{th}$ GOA unit is connected to a signal input terminal of a $(x+k)^{th}$ GOA unit; and the enable signal output unit is configured to successively output an enable signal to the first to $k^{th}$ GOA units at preset time intervals so that the GOA circuit successively outputs a scanning signal from a first group to a $k^{th}$ group of GOA units, and within each one of the preset time intervals, the GOA circuit drives each GOA unit in a corresponding group of GOA units, where k is a positive integer and x is a positive integer;

wherein each of the GOA units has a signal reset terminal, and wherein the signal reset terminal of the $x^{th}$ GOA unit is connected to the signal output terminal of the $(x+k)^{th}$ GOA unit;

the preset time interval is longer than a time interval at which each group of GOA units successively outputs a scanning signal.

In the GOA circuit of the present disclosure, The GOA units in each group of GOA units are all connected to two corresponding high-frequency clock signal sources which are configured to output a high-frequency clock signal, so that The GOA units in each group of GOA units output a scanning signal.

In the GOA circuit of the present disclosure, each GOA unit is connected to a first low-frequency clock signal source, a second low-frequency clock signal source and a DC low-voltage source.

In the GOA circuit of the present disclosure, a first low-frequency clock signal output by the first low-frequency clock signal source and a second low-frequency clock signal output by the second low-frequency clock signal source are the same in waveform but opposite in phase.

In the GOA circuit of the present disclosure, the GOA units are arranged on a side of pixels in a display region.

In the GOA circuit of the present disclosure, when k=3, the plurality of GOA units are divided into 3 groups of GOA units, and the GOA circuit comprises a first high-frequency clock signal source, a second high-frequency clock signal source, a third high-frequency clock signal source, a fourth high-frequency clock signal source, a fifth high-frequency clock signal source, and a six high-frequency clock signal source; wherein the GOA units in the first group are connected to the first high-frequency clock signal source and the second high-frequency clock signal source; the GOA units in the second group are connected to the third high-frequency clock signal source and the fourth high-frequency clock signal source; and the GOA units in the third group are connected to the fifth high-frequency clock signal source and the sixth high-frequency clock signal source.

The present disclosure further provides a GOA circuit having a plurality of GOA units, wherein the plurality of GOA units are divided into k groups of GOA units, and in any group of GOA units, two adjacent GOA units are spaced by k−1 GOA units; and each of the GOA units has a signal input terminal and a signal output terminal, and a signal output terminal of each of the GOA units is connected to a row of scanning lines; wherein the GOA circuit further comprises an enable signal output unit having first to $k^{th}$ output terminals which are in one-to-one correspondence to signal input terminals of the first to $k^{th}$ GOA units, and a signal output terminal of a $x^{th}$ GOA unit is connected to a signal input terminal of a $(x+k)^{th}$ GOA unit; and the enable signal output unit is configured to successively output an enable signal to the first to $k^{th}$ GOA units at preset time intervals so that the GOA circuit successively outputs a scanning signal from a first group to a $k^{th}$ group of GOA units, and within each one of the preset time intervals, the GOA circuit drives each GOA unit in a corresponding group of GOA units, where k is a positive integer and x is a positive integer.

In the GOA circuit of the present disclosure, each of the GOA units has a signal reset terminal, and wherein the signal reset terminal of the $x^{th}$ GOA unit is connected to the signal output terminal of the $(x+k)^{th}$ GOA unit.

In the GOA circuit of the present disclosure, the preset time interval is longer than a time interval at which each group of GOA units successively outputs a scanning signal.

In the GOA circuit of the present disclosure, The GOA units in each group of GOA units are all connected to two corresponding high-frequency clock signal sources which are configured to output a high-frequency clock signal, so that The GOA units in each group of GOA units output a scanning signal.

In the GOA circuit of the present disclosure, each GOA unit is connected to a first low-frequency clock signal source, a second low-frequency clock signal source and a DC low-voltage source.

In the GOA circuit of the present disclosure, a first low-frequency clock signal output by the first low-frequency clock signal source and a second low-frequency clock signal output by the second low-frequency clock signal source are the same in waveform but opposite in phase.

In the GOA circuit of the present disclosure, the GOA units are arranged on a side of pixels in a display region.

In the GOA circuit of the present disclosure, when k=3, the plurality of GOA units are divided into 3 groups of GOA units, and the GOA circuit comprises a first high-frequency clock signal source, a second high-frequency clock signal source, a third high-frequency clock signal source, a fourth high-frequency clock signal source, a fifth high-frequency clock signal source, and a six high-frequency clock signal source; wherein the GOA units in the first group are connected to the first high-frequency clock signal source and the second high-frequency clock signal source; the GOA units in the second group are connected to the third high-frequency clock signal source and the fourth high-frequency clock signal source; and the GOA units in the third group are connected to the fifth high-frequency clock signal source and the sixth high-frequency clock signal source.

For the above purpose, the present disclosure further provides a liquid crystal display panel having a GOA circuit, the GOA circuit including a plurality of GOA units; wherein the plurality of GOA units are divided into k groups of GOA units, and in any group of GOA units, two adjacent GOA units are spaced by k−1 GOA units; and each of the GOA units has a signal input terminal and a signal output terminal, and a signal output terminal of each of the GOA units is connected to a row of scanning lines; wherein the GOA circuit further comprises an enable signal output unit having first to $k^{th}$ output terminals which are in one-to-one correspondence to signal input terminals of the first to $k^{th}$ GOA units, and a signal output terminal of a $x^{th}$ GOA unit is connected to a signal input terminal of a $(x+k)^{th}$ GOA unit; and the enable signal output unit is configured to successively output an enable signal to the first to $k^{th}$ GOA units at preset time intervals so that the GOA circuit successively outputs a scanning signal from a first group to a $k^{th}$ group of GOA units, and within each one of the preset time intervals, the GOA circuit drives each GOA unit in a corresponding group of GOA units, where k is a positive integer and x is a positive integer.

In the liquid crystal display panel of the present disclosure, each of the GOA units has a signal reset terminal, and wherein the signal reset terminal of the $x^{th}$ GOA unit is connected to the signal output terminal of the $(x+k)^{th}$ GOA unit.

In the liquid crystal display panel of the present disclosure, the preset time interval is longer than a time interval at which each group of GOA units successively outputs a scanning signal.

In the liquid crystal display panel of the present disclosure, The GOA units in each group of GOA units are all connected to two corresponding high-frequency clock signal sources which are configured to output a high-frequency clock signal, so that The GOA units in each group of GOA units output a scanning signal.

In the liquid crystal display panel of the present disclosure, the GOA units are arranged on a side of pixels in a display region.

In the liquid crystal display panel of the present disclosure, when k=3, the plurality of GOA units are divided into 3 groups of GOA units, and the GOA circuit comprises a first high-frequency clock signal source, a second high-frequency clock signal source, a third high-frequency clock signal source, a fourth high-frequency clock signal source, a fifth high-frequency clock signal source, and a six high-frequency clock signal source; wherein the GOA units in the first group are connected to the first high-frequency clock signal source and the second high-frequency clock signal source; the GOA units in the second group are connected to the third high-frequency clock signal source and the fourth high-frequency clock signal source; and the GOA units in the third group are connected to the fifth high-frequency clock signal source and the sixth high-frequency clock signal source.

In a GOA circuit and a liquid crystal display panel provided by the present disclosure, by dividing GOA units in a GOA circuit into groups and cascading the GOA units in a group, and by successively outputting an enable signal to the first to $k^{th}$ GOA units at preset time intervals by an enable signal output unit so that the GOA circuit successively outputs a scanning signal from a first group to a $k^{th}$ group of GOA units, the number of cascades of GOA units is reduced, the signal attenuation is decreased, and the display effect of a liquid crystal display panel is thus improved.

DESCRIPTION OF DRAWINGS

In order to explain the technical solutions in the present embodiments or in the prior art more clearly, accompanying drawings required in the description of the present embodiments or prior art will be briefly described. Obviously, accompanying drawings are just some embodiments of the present disclosure, while other drawings may be obtained by those skilled in the art according to these drawings, without making any creative effort.

DETAILED DESCRIPTION OF THE PREFERRED EMBODIMENTS

Following description of each embodiment is referring to the accompanying drawings so as to make the contents of the present disclosure more apparent and understandable. The described embodiments are some but not all of the embodiments of the present disclosure. All other embodiments obtained by a person of ordinary skill in the art based on the embodiments of the present disclosure without creative efforts shall fall within the protection scope of the present disclosure.

In the present disclosure, by dividing GOA units in a GOA circuit, which are directly cascaded in series, into k groups and cascading GOA units in each of the groups, so that a signal output terminal of a previous GOA unit in a group is connected to a signal input terminal of a next GOA unit in the same group. In addition, an enable signal output unit is provided, which has first to $k^{th}$ output terminals which are in one-to-one correspondence to the first to $k^{th}$ GOA units; and the enable signal output unit is configured to successively output an enable signal to the first to $k^{th}$ GOA units at preset time intervals so that the GOA circuit successively outputs a scanning signal from a first group to a $k^{th}$ group of GOA units.

For example, the enable signal output signal outputs an enable signal by a first output terminal to trigger a first GOA unit in a first group of GOA units to output a scanning signal; then, the scanning signal output by the first GOA unit is input to a signal input terminal of a second GOA unit in the first group to trigger the second GOA unit; and similarly, all GOA units in the first group are triggered to output a scanning signal line-by-line. After all GOA units in the first group of GOA units are triggered to output a scanning signal, the enable signal output terminal outputs an enable signal by a second output terminal to trigger a first GOA unit in a second group of GOA units to output a scanning signal; and then, all GOA units in this group are triggered to output a scanning signal in a similar way for GOA units in the first GOA units.

Figure 1:
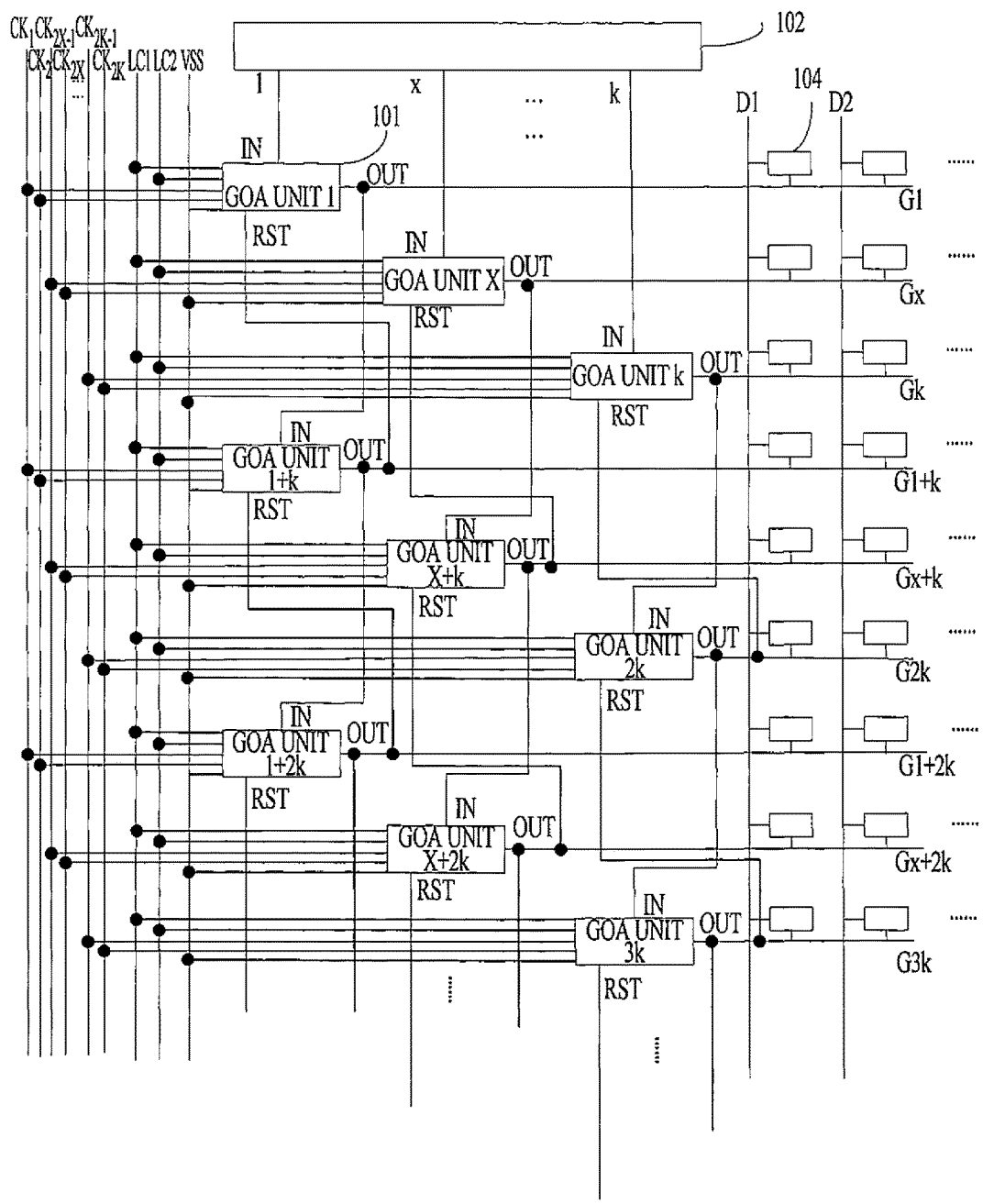
FIG. 1 is a structure diagram of a GOA circuit according to an embodiment of the present disclosure.

FIG. 1 is a structure diagram of a GOA unit according to an embodiment of the present disclosure. As shown in FIG. 1, the GOA circuit comprises a plurality of GOA units 101. Exemplarily, each of the GOA units 101 has a signal output terminal OUT, a signal input terminal IN and a reset terminal RST, wherein the signal output terminal OUT is connected to a row of scanning lines and configured to output a scanning signal; the signal input terminal IN is configured to input a trigger signal to the GOA unit to trigger the GOA unit to start outputting a scanning signal; and the reset terminal RST is configured to make the GOA unit stop outputting the scanning signal.

Specifically, the plurality of GOA units 101 are divided into k groups of GOA units, and in any group of GOA units, two adjacent GOA units 101 are spaced by k−1 GOA units 101. In other words, the first, $(1+k)^{th}$, $(1+2*k)^{th}$, ..., $(1+j*k)^{th}$ GOA units 101 form a first group; the second, $(2+k)^{th}$, $(2+2*k)^{th}$, ..., $(2+j*k)^{th}$ GOA units 101 form a second group; ...; and the $k^{th}$, $(n+k)^{th}$, $(n+2*k)^{th}$, ..., $(n+j*k)^{th}$ GOA units 101 form a $k^{th}$ group, where n is a positive integer and j is a positive integer.

Figure 2:
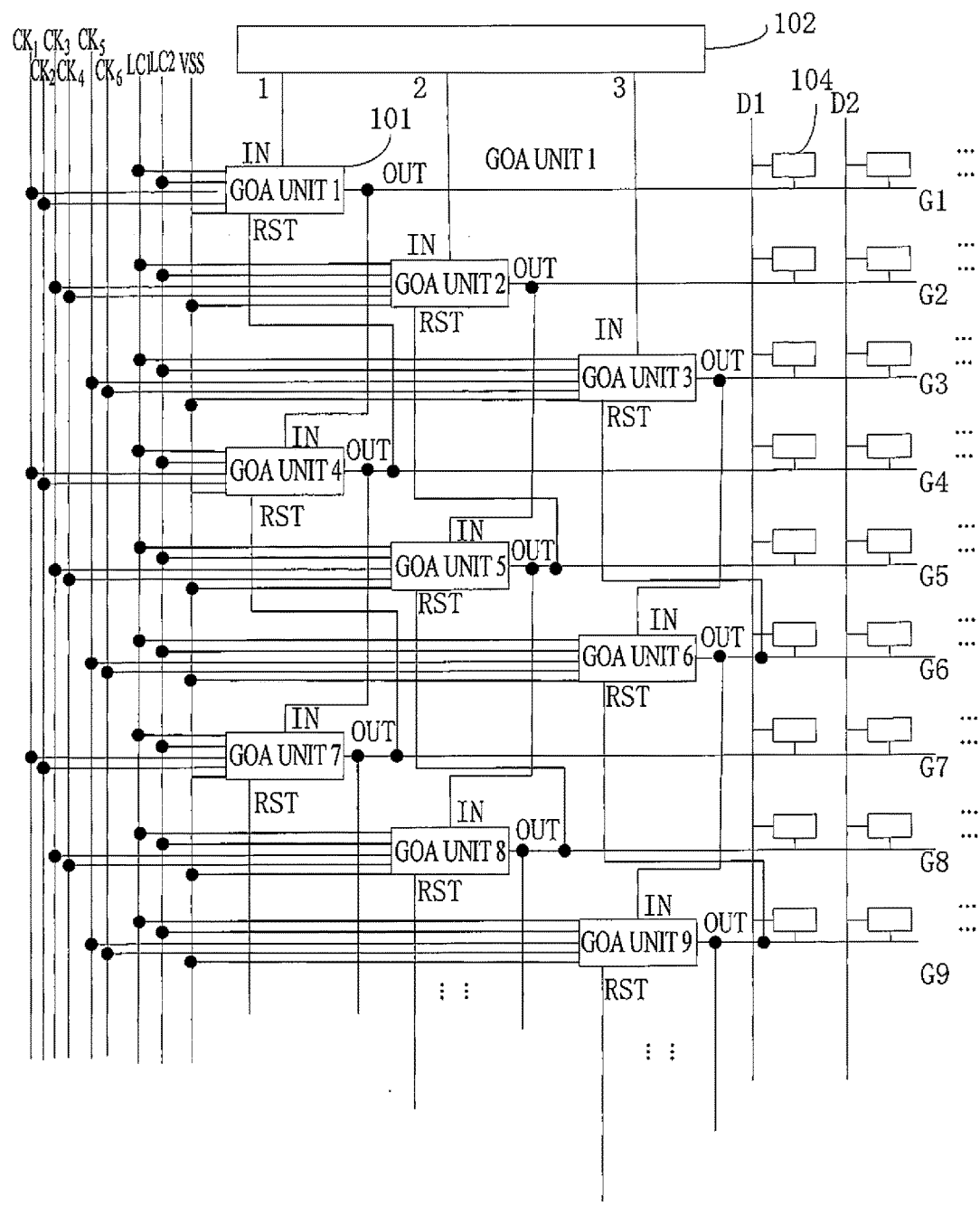
FIG. 2 is another structure diagram of the GOA circuit according to an embodiment of the present disclosure.

For example, as shown in FIG. 2, when k=3, the plurality of GOA units may be divided into 3 groups of GOA units, and in any group of GOA units, adjacent GOA units 101 are spaced by two GOA units 101 from other groups. In other words, the first, fourth, seventh, ..., $(1+j*3)^{th}$ GOA units 101 form a first group; the second, fifth, eighth, ..., $(2+j*3)^{th}$ GOA units 101 form a second group; and the third, sixth, ninth, ..., $(3+j*3)^{th}$ GOA units 101 form a third group, where n is a positive integer and j is a positive integer.

Further, as shown in FIG. 1, the GOA circuit further comprises an enable signal output unit 102 having first to $k^{th}$ output terminals which are in one-to-one correspondence to and connected to the first to $k^{th}$ GOA units 101, and a signal output terminal OUT of an $x^{th}$ GOA unit 101 is connected to a signal input terminal IN of a $(x+k)^{th}$ GOA unit 101, and a signal reset terminal RST of the $x^{th}$ GOA unit 101 is connected to a signal output terminal OUT of the $(x+k)^{th}$ GOA unit 101; and the enable signal output unit 102 is configured to successively output an enable signal to the first to $k^{th}$ GOA units 101 at preset time intervals so that the GOA circuit successively outputs a scanning signal from a first group to a $k^{th}$ group of GOA units, and within each one of the preset time intervals, the GOA circuit drives each GOA unit in a corresponding group of GOA units, where k is a positive integer and x is a positive integer.

It is to be noted that the signal input terminals IN of the first to $k^{th}$ GOA units 101 are in one-to-one correspondence to first to $k^{th}$ terminals of the enable signal output unit 102. That is, an enable signal input by the signal input terminals IN of the first to $k^{th}$ GOA units 101 is a trigger signal which is used for triggering the first to $k^{th}$ GOA units 101 to start outputting a scanning signal. A signal input terminal IN of a GOA unit 101 following the first to $k^{th}$ GOA units 101 is connected to a signal output terminal OUT of a corresponding GOA unit 101. That is, a scanning signal output by a corresponding GOA unit 101 is applied to a signal input terminal IN of a GOA unit 101 following the first to $k^{th}$ GOA units 101, as a trigger signal for this GOA unit following the first to $k^{th}$ GOA units 101, to trigger this GOA unit to start outputting a scanning signal.

Specifically, a first output terminal 1 to a $k^{th}$ output terminal k of the enable signal output unit 102 are connected to a signal input terminal IN of a first GOA unit 101 in each group. Since other GOA units 101 in each group are successively cascaded following the first GOA unit 101 in the group, it is equivalent that all GOA units 101 are controlled by the enable signal output unit 102. The enable signal output unit 102 controls the GOA circuit to successively output a scanning signal from the first group to the $k^{th}$ group of GOA units.

Further, the k groups of GOA units 101 in the GOA circuit are all connected to two corresponding high-frequency clock signal sources which are configured to output a high-frequency clock signal, so that GOA units 101 in each group of GOA units output a scanning signal. Specifically, the GOA units 101 in the first group of GOA units are all connected to a first high-frequency clock signal source $CK_1$ and a second high-frequency clock signal source $CK_2$; the GOA units 101 in the $x^{th}$ group of GOA units are all connected to a $(2x−1)^{th}$ high-frequency clock signal source $CK_{2x-1}$ and a $(2x)^{th}$ high-frequency clock signal source $CK_{2x}$; ...; the GOA units 101 in the $k^{th}$ group of GOA units are all connected to a $(2k−1)^{th}$ high-frequency clock signal source $CK_{2k-1}$ and a $k^{th}$ high-frequency clock signal source $CK_{2k}$.

For example, as shown in FIG. 2, when k=3, the k groups of GOA units 101 in the GOA circuit are all connected to two corresponding high-frequency clock signal sources which are configured to output a high-frequency clock signal, so that GOA units 101 in each group of GOA units output a scanning signal. Specifically, the GOA units 101 in the first group of GOA units are all connected to a first high-frequency clock signal source $CK_1$ and a second high-frequency clock signal source $CK_2$; the GOA units 101 in the second group of GOA units are all connected to a third high-frequency clock signal source $CK_3$ and fourth high-frequency clock signal source $CK_4$; and the GOA units 101 in the third group of GOA units are all connected to a fifth high-frequency clock signal source $CK_5$ and a sixth high-frequency clock signal source $CK_6$.

In addition, the GOA units 101 in the GOA circuit are all connected to a first low-frequency clock signal source LC1, a second low-frequency clock signal source LC2 and a DC low-voltage source VSS, wherein, a first low-frequency clock signal output by the first low-frequency clock signal source LC1 and a second low-frequency clock signal output by the second low-frequency clock signal source LC1 are the same in waveform but opposite in phase. It is to be noted that a first low-frequency clock signal output by the first low-frequency clock signal source LC1, a second low-frequency clock signal output by the second low-frequency clock signal source LC2, and a DC low-voltage output by the DC low-voltage source VSS are all used as an input signal to each GOA unit, to together initiate each GOA unit to output a scanning signal.

Figure 3:
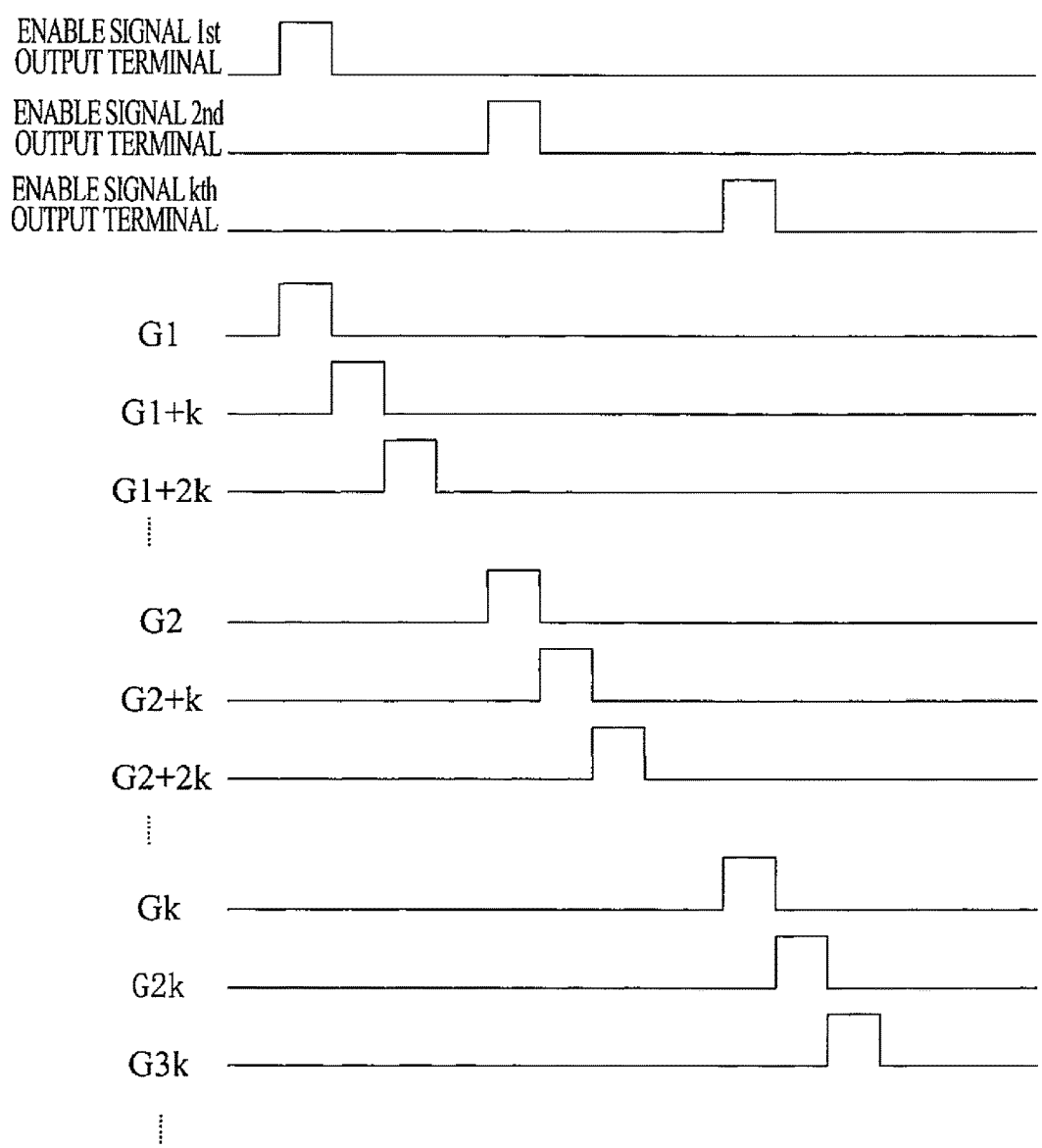
FIG. 3 is a timing diagram of the GOA circuit according to an embodiment of the present disclosure.

The operation of the GOA circuit will be described in detail with reference to the operation timing diagram of the GOA circuit according to an embodiment of the present disclosure. With reference to FIG. 3, FIG. 3 is a timing diagram of the GOA circuit according to an embodiment of the present disclosure.

Referring to FIG. 1 and FIG. 3, when the GOA circuit operates, the first high-frequency clock signal source $CK_1$ and the second high-frequency clock signal source $CK_2$ corresponding to the first group of GOA units output corresponding high-frequency clock signals, the first low-frequency clock signal source LC1 outputs a first low-frequency clock signal, the second low-frequency clock signal source LC2 outputs a second low-frequency clock signal, and the DV low-voltage source VSS outputs a DC low-voltage, all of which together initiate GOA units 101 in the first groups of GOA units. At this moment, the enable signal output unit 102 outputs an enable signal by a first output terminal 1 to initiate a first GOA unit 101 in the first group of GOA units, so that the first GOA unit 101 in the first group of GOA units outputs a scanning signal; and then, the GOA units 101 cascaded following the first GOA unit in the first group of GOA units successively output a scanning signal.

Then, the third high-frequency clock signal source $CK_3$ and the fourth high-frequency clock signal source $CK_4$ corresponding to the second group of GOA units output corresponding high-frequency clock signals, the first low-frequency clock signal source LC1 outputs a first low-frequency clock signal, the second low-frequency clock signal source LC2 outputs a second low-frequency clock signal, and the DV low-voltage source VSS outputs a DC low-voltage, all of which together initiate GOA units 101 in the second groups of GOA units. At this moment, the enable signal output unit 102 outputs an enable signal by a second output terminal 2 after a preset time interval to initiate a first GOA unit 101 in the second group of GOA units, so that the first GOA unit 101 in the second group of GOA units outputs a scanning signal; and then, the GOA units 101 cascaded following the first GOA unit 101 in the second group of GOA units successively output a scanning signal. Similarly, the rest may be deduced by analogy, each of the GOA units in the $k^{th}$ group of GOA units outputs a scanning signal.

It is to be noted that the preset time interval is longer than a time interval at which each group of GOA units successively outputs a scanning signal. Specifically, after the enable signal output unit outputs an enable signal by a first output terminal, and after all GOA units in the first group of GOA units output a scanning signal, the enable signal output unit does not output an enable signal by a second output terminal. Instead, the enable signal output unit outputs an enable signal by a second output terminal after a time interval. It is to be noted that "outputting an enable signal after a time interval" will not influence the driving of the scanning lines. In this embodiment, it is ensured that the GOA units can be enabled sequentially, by designing the preset time interval to be longer than the time interval at which each group of scanning line successively outputs a scanning line.

The present disclosure further provides a liquid crystal display panel which adopts the aforementioned GOA circuit. The specific structure can be referred to the foregoing GOA circuit and will not be reiterated herein to avoid redundancy.

In the GOA circuit and the liquid crystal display panel provided by the present disclosure, by dividing GOA units in a GOA circuit into groups and cascading the GOA units in a group, and by successively outputting an enable signal to the first to $k^{th}$ GOA units at preset time intervals so that the GOA circuit successively outputs a scanning signal from a first to a $k^{th}$ group of scanning lines, the number of cascades of GOA units is reduced, the signal attenuation is decreased, and the display effect of a liquid crystal display panel is thus improved.

What is claimed is:

1. A GOA circuit, comprising a plurality of GOA units; wherein the plurality of GOA units are divided into k groups of GOA units, and the GOA units that belong to a same group are arranged along a vertical direction, and two vertically-adjacent GOA units that belong to the same group are spaced by k−1 GOA units that belong to other groups; and each of the GOA units has a signal input terminal and a signal output terminal, and a signal output terminal of each of the GOA units is connected to a row of scanning lines; wherein the GOA circuit further comprises an enable signal output unit having first to $k^{th}$ output terminals which are in one-to-one correspondence to the signal input terminals of the first to $k^{th}$ GOA units, and a signal output terminal of an $x^{th}$ GOA unit is connected to a signal input terminal of a $(x+k)^{th}$ GOA unit; and the enable signal output unit is configured to successively output an enable signal to the first to $k^{th}$ GOA units at preset time intervals so that the GOA circuit successively outputs a scanning signal from a first group to a $k^{th}$ group of GOA units, and within each one of the preset time intervals, the GOA circuit drives each GOA unit in a corresponding group of GOA units, where k is a positive integer and x is a positive integer;

wherein each of the GOA units has a signal reset terminal, and wherein the signal reset terminal of the $x^{th}$ GOA unit is connected to the signal output terminal of the $(x+k)^{th}$ GOA unit;

the preset time interval is longer than a time interval at which each group of GOA units successively outputs a scanning signal;

each GOA unit is connected to a high-frequency clock signal source and a low-frequency clock signal source.

2. The GOA circuit as claimed in claim 1, wherein the GOA units in each group of GOA units are all connected to two corresponding high-frequency clock signal sources which are configured to output a high-frequency clock signal, so that the GOA units in each group of GOA units output a scanning signal.

3. The GOA circuit as claimed in claim 2, wherein each GOA unit is connected to a first low-frequency clock signal source, a second low-frequency clock signal source and a DC low-voltage source.

4. The GOA circuit as claimed in claim 3, wherein a first low-frequency clock signal output by the first low-frequency clock signal source and a second low-frequency clock signal output by the second low-frequency clock signal source are the same in waveform but opposite in phase.

5. The GOA circuit as claimed in claim 1, wherein the GOA units are arranged on a side of pixels in a display region.

6. The GOA circuit as claimed in claim 1, wherein, when k=3, the plurality of GOA units are divided into 3 groups of GOA units, and the GOA circuit comprises a first high-frequency clock signal source, a second high-frequency clock signal source, a third high-frequency clock signal source, a fourth high-frequency clock signal source, a fifth high-frequency clock signal source, and a six high-frequency clock signal source; wherein the GOA units in the first group are connected to the first high-frequency clock signal source and the second high-frequency clock signal source; the GOA units in the second group are connected to the third high-frequency clock signal source and the fourth high-frequency clock signal source; and the GOA units in the third group are connected to the fifth high-frequency clock signal source and the sixth high-frequency clock signal source.

7. A GOA circuit, comprising a plurality of GOA units; the plurality of GOA units are divided into k groups of GOA units, and the GOA units that belong to a same group are arranged along a vertical direction, and two vertically-adjacent GOA units that belong to the same group are spaced by k−1 GOA units that belong to other groups; and each of the GOA units has a signal input terminal and a signal output terminal, and a signal output terminal of each of the GOA units is connected to a row of scanning lines; wherein the GOA circuit further comprises an enable signal output unit having first to $k^{th}$ output terminals which are in one-to-one correspondence to signal input terminals of the first to $k^{th}$ GOA units, and a signal output terminal of a $x^{th}$ GOA unit is connected to a signal input terminal of a $(x+k)^{th}$ GOA unit; and the enable signal output unit is configured to successively output an enable signal to the first to $k^{th}$ GOA units at preset time intervals so that the GOA circuit successively outputs a scanning signal from a first group to a $k^{th}$ group of GOA units, and within each one of the preset time intervals, the GOA circuit drives each GOA unit in a corresponding group of GOA units, where k is a positive integer and x is a positive integer;

each GOA unit connected to a high-frequency clock signal source and a low-frequency clock signal source.

8. The GOA circuit as claimed in claim 7, wherein each of the GOA units has a signal reset terminal, and wherein the signal reset terminal of the $x^{th}$ GOA unit is connected to the signal output terminal of the $(x+k)^{th}$ GOA unit.

9. The GOA circuit as claimed in claim 7, wherein the preset time interval is longer than a time interval at which each group of GOA units successively outputs a scanning signal.

10. The GOA circuit as claimed in claim 7, wherein the GOA units in each group of GOA units are all connected to two corresponding high-frequency clock signal sources which are configured to output a high-frequency clock signal, so that the GOA units in each group of GOA units output a scanning signal.

11. The GOA circuit as claimed in claim 10, wherein each GOA unit is connected to a first low-frequency clock signal source, a second low-frequency clock signal source and a DC low-voltage source.

12. The GOA circuit as claimed in claim 11, wherein a first low-frequency clock signal output by the first low-frequency clock signal source and a second low-frequency clock signal output by the second low-frequency clock signal source are the same in waveform but opposite in phase.

13. The GOA circuit as claimed in claim 7, wherein the GOA units are arranged on a side of pixels in a display region.

14. The GOA circuit as claimed in claim 7, wherein, when k=3, the plurality of GOA units are divided into 3 groups of GOA units, and the GOA circuit comprises a first high-frequency clock signal source, a second high-frequency clock signal source, a third high-frequency clock signal source, a fourth high-frequency clock signal source, a fifth high-frequency clock signal source, and a six high-frequency clock signal source; wherein the GOA units in the first group are connected to the first high-frequency clock signal source and the second high-frequency clock signal source; the GOA units in the second group are connected to the third high-frequency clock signal source and the fourth high-frequency clock signal source; and the GOA units in the third group are connected to the fifth high-frequency clock signal source and the sixth high-frequency clock signal source.

15. A liquid crystal display panel, comprising a GOA circuit, the GOA circuit comprising a plurality of GOA units; wherein the plurality of GOA units are divided into k groups of GOA units, and the GOA units that belong to a same group are arranged along a vertical direction, and two vertically-adjacent GOA units that belong to the same group are spaced by k−1 GOA units that belong to other groups; and each of the GOA units has a signal input terminal and a signal output terminal, and a signal output terminal of each of the GOA units is connected to a row of scanning lines; wherein the GOA circuit further comprises an enable signal output unit having first to $k^{th}$ output terminals which are in one-to-one correspondence to signal input terminals of the first to $k^{th}$ GOA units, and a signal output terminal of a $x^{th}$ GOA unit is connected to a signal input terminal of a $(x+k)^{th}$ GOA unit; and the enable signal output unit is configured to successively output an enable signal to the first to $k^{th}$ GOA units at preset time intervals so that the GOA circuit successively outputs a scanning signal from a first group to a $k^{th}$ group of GOA units, and within each one of the preset time intervals, the GOA circuit drives each GOA unit in a corresponding group of GOA units, where k is a positive integer and x is a positive integer;

each GOA unit is connected to a high-frequency clock signal source and a low-frequency clock signal source.

16. The liquid crystal display panel as claimed in claim 15, wherein each of the GOA units has a signal reset terminal, and wherein the signal reset terminal of the $x^{th}$ GOA unit is connected to the signal output terminal of the $(x+k)^{th}$ GOA unit.

17. The liquid crystal display panel as claimed in claim 15, wherein the preset time interval is longer than a time interval at which each group of GOA units successively outputs a scanning signal.

18. The liquid crystal display panel as claimed in claim 15, wherein the GOA units in each group of GOA units are all connected to two corresponding high-frequency clock signal sources which are configured to output a high-frequency clock signal, so that the GOA units in each group of GOA units output a scanning signal.

19. The liquid crystal display panel as claimed in claim 15, wherein the GOA units are arranged on a side of pixels in a display region.

20. The liquid crystal display panel as claimed in claim 15, wherein, when k=3, the plurality of GOA units are divided into 3 groups of GOA units, and the GOA circuit comprises a first high-frequency clock signal source, a second high-frequency clock signal source, a third high-frequency clock signal source, a fourth high-frequency clock signal source, a fifth high-frequency clock signal source, and a six high-frequency clock signal source; wherein the GOA units in the first group are connected to the first high-frequency clock signal source and the second high-frequency clock signal source; the GOA units in the second group are connected to the third high-frequency clock signal source and the fourth high-frequency clock signal source; and the GOA units in the third group are connected to the fifth high-frequency clock signal source and the sixth high-frequency clock signal source.

\* \* \* \* \*